United States Patent [19]
Smith, III

[11] Patent Number: 5,899,228
[45] Date of Patent: May 4, 1999

[54] UNDERSEA HYDRAULIC COUPLING WITH LOCKING MECHANISM

[75] Inventor: Robert E. Smith, III, Missouri City, Tex.

[73] Assignee: National Coupling Company, Inc., Stafford, Tex.

[21] Appl. No.: 08/928,968

[22] Filed: Sep. 12, 1997

[51] Int. Cl.$^6$ .................................................. F17D 65/20
[52] U.S. Cl. .............................. 137/614.04; 137/614.05; 285/91; 285/282
[58] Field of Search .................. 137/614.04, 614.05, 137/614.06; 285/277, 91, 282

[56] References Cited

U.S. PATENT DOCUMENTS

| | | | |
|---|---|---|---|
| 496,301 | 4/1893 | Farrington | 137/614.05 |
| 1,799,433 | 4/1931 | Murphy | 137/614.05 |
| 2,255,593 | 9/1941 | Berger et al. | 137/614.04 |
| 2,896,977 | 7/1959 | Hansen | 137/614.04 |
| 3,234,965 | 2/1966 | Anderson | 137/614.04 |
| 3,462,117 | 8/1969 | Lind | 137/614.05 |
| 4,137,930 | 2/1979 | Scholle | 137/614.04 |
| 4,509,554 | 4/1985 | Failla | 137/614.04 |
| 5,355,909 | 10/1994 | Smith, III | 137/614.04 |

FOREIGN PATENT DOCUMENTS

| | | | |
|---|---|---|---|
| 404619 | 1/1934 | United Kingdom | 137/614.05 |

*Primary Examiner*—Denise L. Ferensic
*Assistant Examiner*—John Ball
*Attorney, Agent, or Firm*—Arnold White & Durkee

[57] ABSTRACT

A locking mechanism for male and female coupling members for use in undersea production and drilling applications is disclosed. At least one pin extends radially from the female member. Each pin enters a slot in a guide sleeve extending longitudinally from the male member. The guide sleeve also contains a spring and spring plate. The female member is inserted into the guide sleeve, compressing the spring, and the pin enters the first longitudinal portion of the slot. The female member may be rotated with respect to the male member when the pin is in the circumferential portion of the slot. The pin then may enter the second or third longitudinal portion of the slot. When the pin is in the second portion of the slot, the female member is "parked" or secured to the male member while coupling member valves remain closed, and when the pin is in the third portion of the slot, the valves are open. When the female member is released, the spring urges the female member outwardly from the bore and the pin reaches the end of the second or third portion of the slot, at which time the coupling members are locked together. The present invention allows locking and unlocking of undersea hydraulic couplings with a "one hand" ROV operation.

12 Claims, 4 Drawing Sheets

5,899,228

UNDERSEA HYDRAULIC COUPLING WITH LOCKING MECHANISM

BACKGROUND OF THE INVENTION

1. Field of the Invention

The present invention relates to hydraulic couplings used in undersea drilling and production applications. More particularly, the invention involves a locking mechanism for restraining axial movement of male and female coupling members used in undersea applications.

2. Description of the Related Art

Subsea hydraulic couplings are old in the art. Subsea hydraulic couplings are shown, for example, in U.S. Pat. No. 4,694,859 to Robert E. Smith III, and other patents assigned to National Coupling Company, Inc. of Stafford, Tex. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling.

The male member includes a cylindrical body having an outer diameter approximately equal to the diameter of the large female bore, and a connection at its other end for hydraulic lines. When the cylindrical body of the male member is inserted into the large bore of the female member, according to various embodiments of the device, fluid flow is established between the male and female members.

The male member and female member are generally connected to opposing junction plates of a manifold and are held together by bolts or hydraulic members attached to the plate. The male member is commonly attached to one junction or manifold plate, while the female member is attached to an opposing plate so as to face the male member and align with it. The male and female members may be attached to the junction or manifold plates using various means such as set screws or threads.

Typically, several subsea hydraulic couplings are grouped together on each junction or manifold plate. For example, between 10 and 30 coupling members may be attached to each opposing plate. In the subsea environment, a diver may be required to connect the opposing plates together, and thereby connect the opposing coupling members on the plates. The coupling members are simultaneously connected and the opposing plates are locked together. U.S. Pat. No. 4,915,419 to Robert E. Smith III, assigned to National Coupling Company, Inc. of Stafford, Tex. discloses a sliding lock plate used for connecting together subsea hydraulic couplings.

Attempts have been made in the past to eliminate or reduce the problems of high separational forces of the couplings due to high pressure in the hydraulic system, by individually locking together the male and female members in each coupling. In the subsea environment, however, individually locking each of the hydraulic coupling members together has been a difficult undertaking.

A proposed solution was the use of lock sleeves for subsea hydraulic couplings. The lock sleeve is pulled back axially to release balls inside the female coupling member. After the male member has entered and seated in the female member, the lock sleeve is released, allowing the balls to reposition in the female and lock the male member and female member together. However, the lock sleeve has a number of disadvantages. It is relatively heavy and bulky, which is undesirable in the subsea environment. Additionally, the lock sleeve requires substantial vertical clearance sufficient to allow for the longitudinal movement necessary for connection or disconnection. Other problems are caused by a build up of silt, ocean debris and marine growth in the lock sleeve. The build up may result in jamming the lock sleeves and especially the locking balls. The couplings require high longitudinal thrust and cannot be disconnected without great difficulty after a period of time subsea.

A reliable solution is needed for locking together subsea couplings that can be easily handled in the subsea environment. In undersea drilling and production applications at increasingly greater depths, it is desirable to connect and/or disconnect the coupling members with robotics or other diverless apparatus. A simple mechanism for connecting and locking together subsea hydraulic coupling members is needed that can be operated without a diver.

In subsea hydraulic applications, remote operating vehicles (ROVs) are needed to grip one of the coupling members (typically the female member) subsea and connect that member to the opposing coupling member. Preferably, the number of different discrete motions required of the ROV should be minimized. Additionally, in order to reduce the complexity of connecting and/or disconnecting coupling members subsea, it is preferable that the ROV connect the couplings in a so-called "one handed" manner by gripping only one of the coupling members, rather than gripping two components such as both coupling members.

It also is desirable to discontinue flow of hydraulic fluid in the coupling by closing the valves in the male and female coupling members, without disconnecting and retrieving one set of members (i.e., the female coupling members). For example, because of adverse weather conditions, strong currents and potential damage to the hydraulic system, it is necessary to shut off the flow of hydraulic fluid to prevent leakage and ensuing damage to the subsea environment. Rather than retrieve the female coupling members while the male coupling members remain subsea, a reliable solution is needed for temporarily "parking" the female coupling members subsea when the valves in the coupling are closed.

SUMMARY OF THE INVENTION

The present invention overcomes the above mentioned problems and disadvantages by providing a locking mechanism for undersea hydraulic couplings that is simple to operate and can be locked and unlocked "one handed" by a remote operating vehicle (ROV) at subsea locations. The locking mechanism includes a female member having a pin that enters a slot in a guide sleeve extending from the male coupling member. The female coupling member enters the guide sleeve, then the male member enters the female member bore, then the pin enters the slot in the guide sleeve. After the female member has fully entered the guide sleeve, compressing the spring in the guide sleeve, the female member is rotated on its longitudinal axis with respect to the male member, preferably less than ninety degrees. When the the female member is released, the spring in the guide sleeve urges the female member outwardly until the pin locks in one of the portions of the slot in the guide sleeve. To disengage the hydraulic coupling, the same operation is reversed.

In the locked position, the pin is positioned in the slot when the coupling member valves are open. In a preferred embodiment, the slot includes two separate portions where the pin is positioned and the female coupling member is locked to the guide sleeve. In one portion of the slot, the valves of the coupling members are open. If desired, another portion of the slot may be included where the pin may be positioned and locked with the valves closed, so that the female coupling member can be "parked" where it remains securely attached to the guide sleeve. When the female member is locked in the "park" position, it can remain secured subsea to the male coupling member absent hydraulic flow through the coupling. This feature eliminates the time required for an ROV to move female coupling members to another secure location.

The advantages of the present invention includes its simplicity, high reliability and light weight. Another advantage of the present invention is that it is less bulky than the prior art. The present invention allows "one hand" makeup by an ROV to lock the coupling members together, and does not require gripping any component other than the female coupling member. Another advantage of the present invention is that it will not tend to jam up with silt, ocean debris and marine growth during use.

DETAILED DESCRIPTION OF A PREFERRED EMBODIMENT

Figure 1:
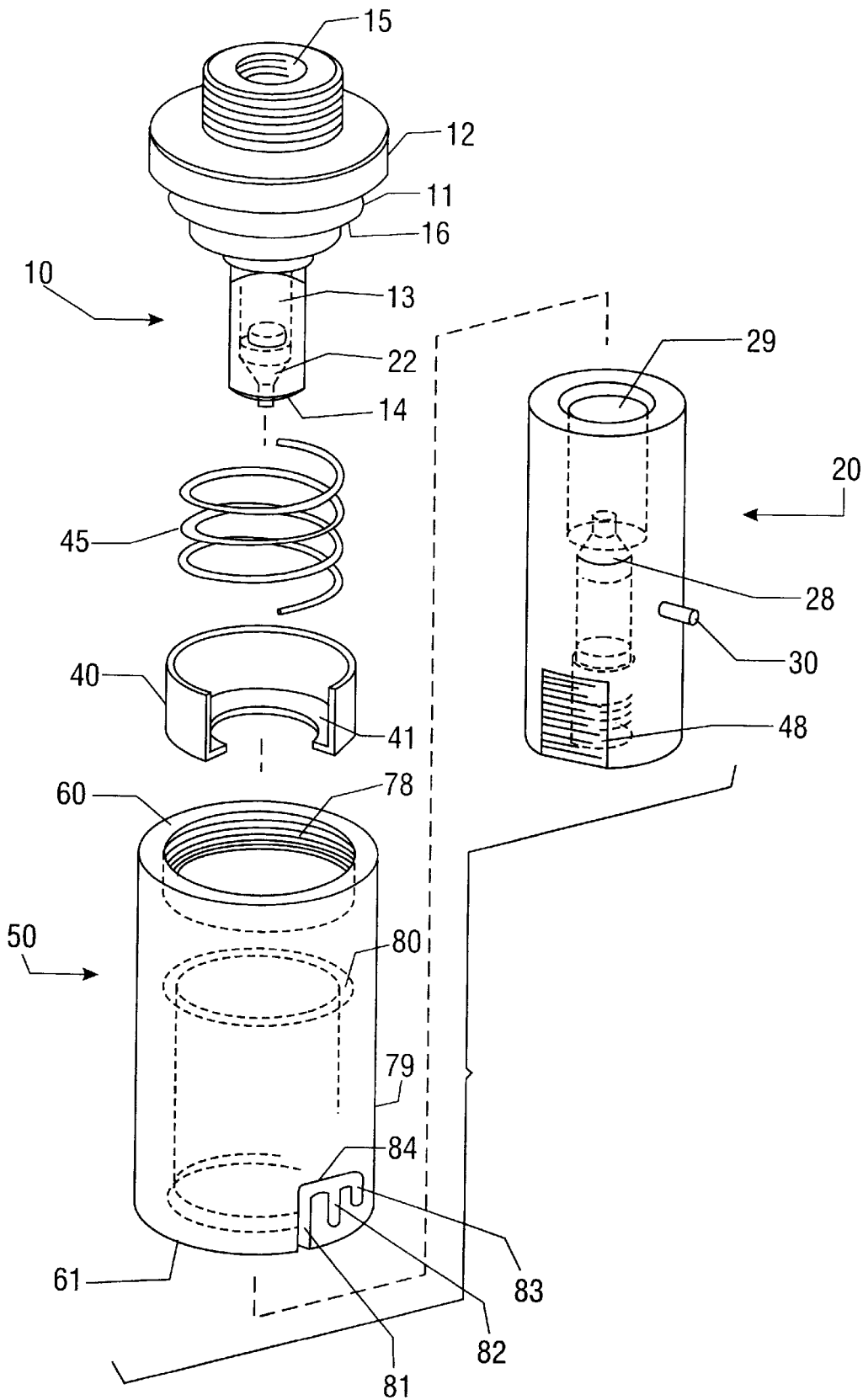
FIG. 1 is an exploded perspective view of the male and female coupling members and locking mechanism according to a preferred embodiment of the present invention.

FIG. 1 is an exploded perspective view of a male coupling member (10) and a female coupling member (20) according to a preferred embodiment of the present invention. The male coupling member (10) has an internal bore (15) extending therethrough and preferably has a poppet valve (22) inserted therein for controlling the flow of hydraulic fluid through the bore. Poppet valve (22) is urged into the normally closed position by poppet valve spring (17) which is held in the bore by spring collar (18) and lock ring (23). The male member has a flange (12) at one end thereof and a threaded section (11) having a smaller diameter than flange (12). Adjacent to threaded section (11) is probe wall (13) which terminates at leading face (14). Between the probe wall (13) and threaded section (11) is external shoulder (16). Positioned on the shoulder (16) is spring (45) which is preferably a helical coil spring, although other types of springs may be used. Spring plate (40) which has as inwardly extending shoulder (41) is positioned over the spring (45).

The first end (60) of guide sleeve (50) is internally threaded for releasably engaging threads (11) in the male member. Guide sleeve (50) has a bore (78) extending therethrough. The sleeve body (79) has a generally cylindrical shape. Bore (78) has an internal shoulder (80) therein. Shoulder (80) narrows the diameter of bore (78) so that the first end of the bore has a diameter slightly greater than the outer diameter of the spring plate (40), and the second end of the bore has a diameter slightly greater than the diameter of the female member (20). Spring plate (40) is positioned between internal shoulder (80) in the guide sleeve and external shoulder (16) of the male coupling member.

At the second end (61) of the guide sleeve is a slot through the sleeve body to the bore. The slot has several interconnected portions as will be explained below. After initial entry of the female member into the second end (61) of the guide sleeve, followed by entry of the male coupling member into the female member bore, the pin enters and slides into first longitudinal portion (81) of the slot at the second end of the guide sleeve. In a preferred embodiment, the slot includes a second longitudinal portion (82) that provides a "park" position for the female coupling member, which terminates before the second end of the guide sleeve. In the "park" position, the poppet valves (22, 28) in the male and female members are closed because the female member has sufficiently withdrawn from the guide sleeve (and the male member has sufficiently withdrawn from the female member bore) so that the valve actuators (19, 44) have separated. In the third longitudinal portion (83) of the slot, the poppet valves in the male and female members are open for the transmission of hydraulic fluid. The third longitudinal portion of the slot also terminates before the second end of the guide sleeve. The second longitudinal portion of the slot is greater in length than the third portion, thus allowing the valves to close when the pin is in the second longitudinal portion. Both the second and third longitudinal portions of the slot provide locked positions in which the female member is securely attached to the male member subsea. A circumferential portion (84) connects the three longitudinal portions of the slot along the outer circumference of the sleeve body. Preferably, the circumferential portion (84) extends less than ninety degrees around the outer circumference of the sleeve body. Each portion of the slot is dimensioned to have a width slightly greater than the diameter of pin (30) which extends radially outwardly from the body of female member (20). Although the preferred embodiment described above includes a second portion of the slot for locking the coupling members in the "parked" position with the valves closed, it also is contemplated that the slot may have only two longitudinal portions, if it is not required to "park" the female coupling member in a locked position.

As discussed above, guide sleeve (50) has a bore dimensioned to slidingly receive female member (20). The female member is a cylindrical body having a longitudinal bore (29) dimensioned to receive probe (13). Intermediate the female member (20) is a pin (30) extending radially outwardly therefrom. Pin (30) is dimensioned to have a diameter slightly less than the width of the slot in guide sleeve (50).

The female member (20) preferably has a poppet vale (28) for controlling fluid flow through the bore. Poppet valve (28) is urged into the normally closed position by valve spring (41) which is in contact with spring collar (42) and held in the bore by lock ring (43). The bore of the female member may have one or more seals (31) which may be elastomeric seals or pressure-energized metal seals for engaging the outer circumference of the probe wall (13) of the male member. In a preferred embodiment, when the male member and female member are fully engaged, value actuator (19) on poppet vale (22) of the male member contacts valve actuator (44) on poppet valve (28) of the female member to urge the poppet values open and establish flow of hydraulic fluid between the coupling members. However, the invention also may be used with non-valved coupling members.

Figure 2:
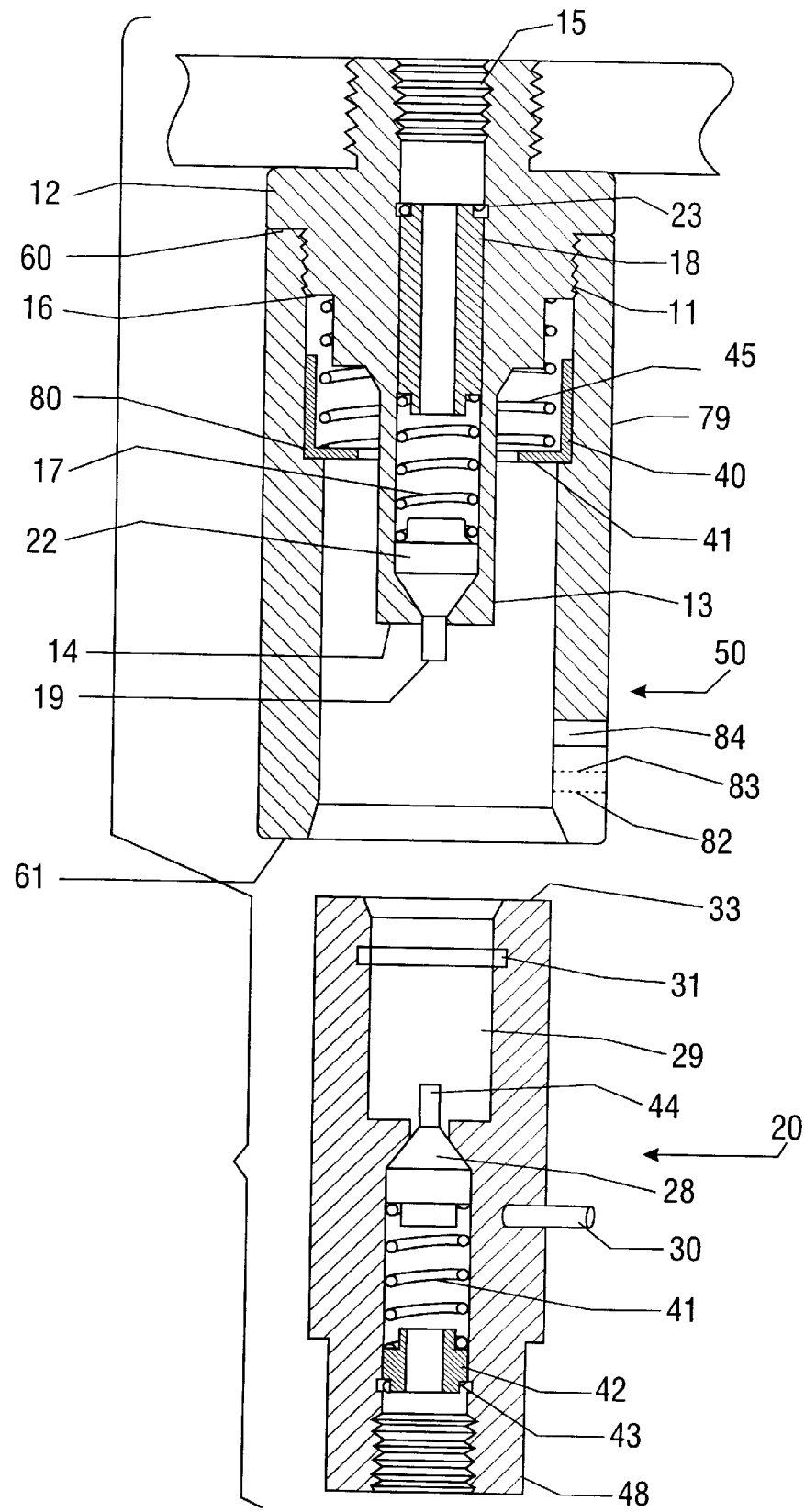
FIG. 2 is a cross section view of the male and female coupling members according to a preferred embodiment of the invention, before they are connected.

In FIG. 2, the male and female members are shown prior to engagement. In this position, spring (45) urges shoulder (41) of spring plate (40) against internal shoulder (80) in guide sleeve (50). The spring plate remains in this position until the female member is inserted into the sleeve and the leading face (33) of the female member pushes against shoulder (41) of spring plate (40) to compress spring (45).

Figure 3:
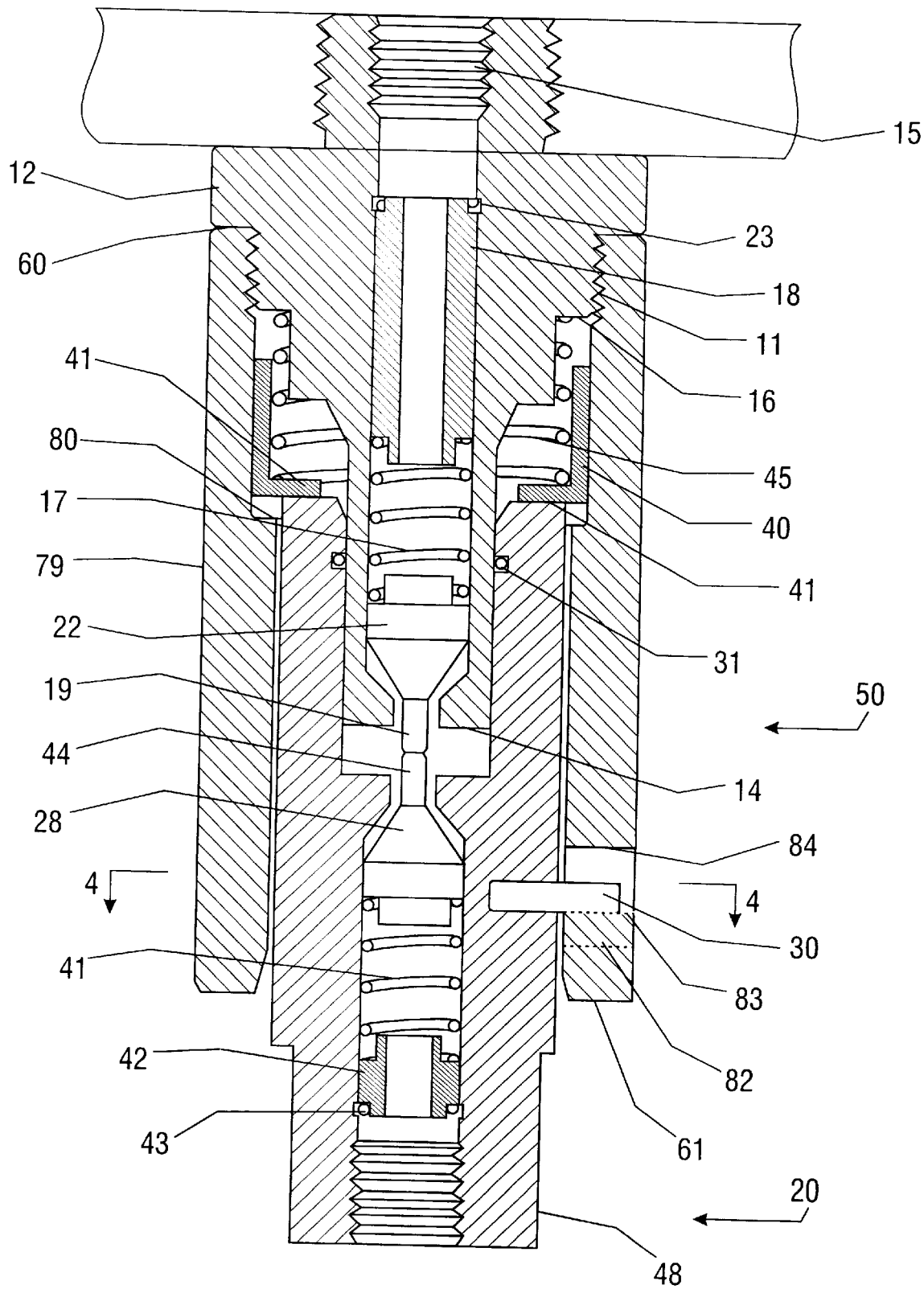
FIG. 3 is a cross section view of the connected male and female coupling members with the locking mechanism engaged.
Figure 4:
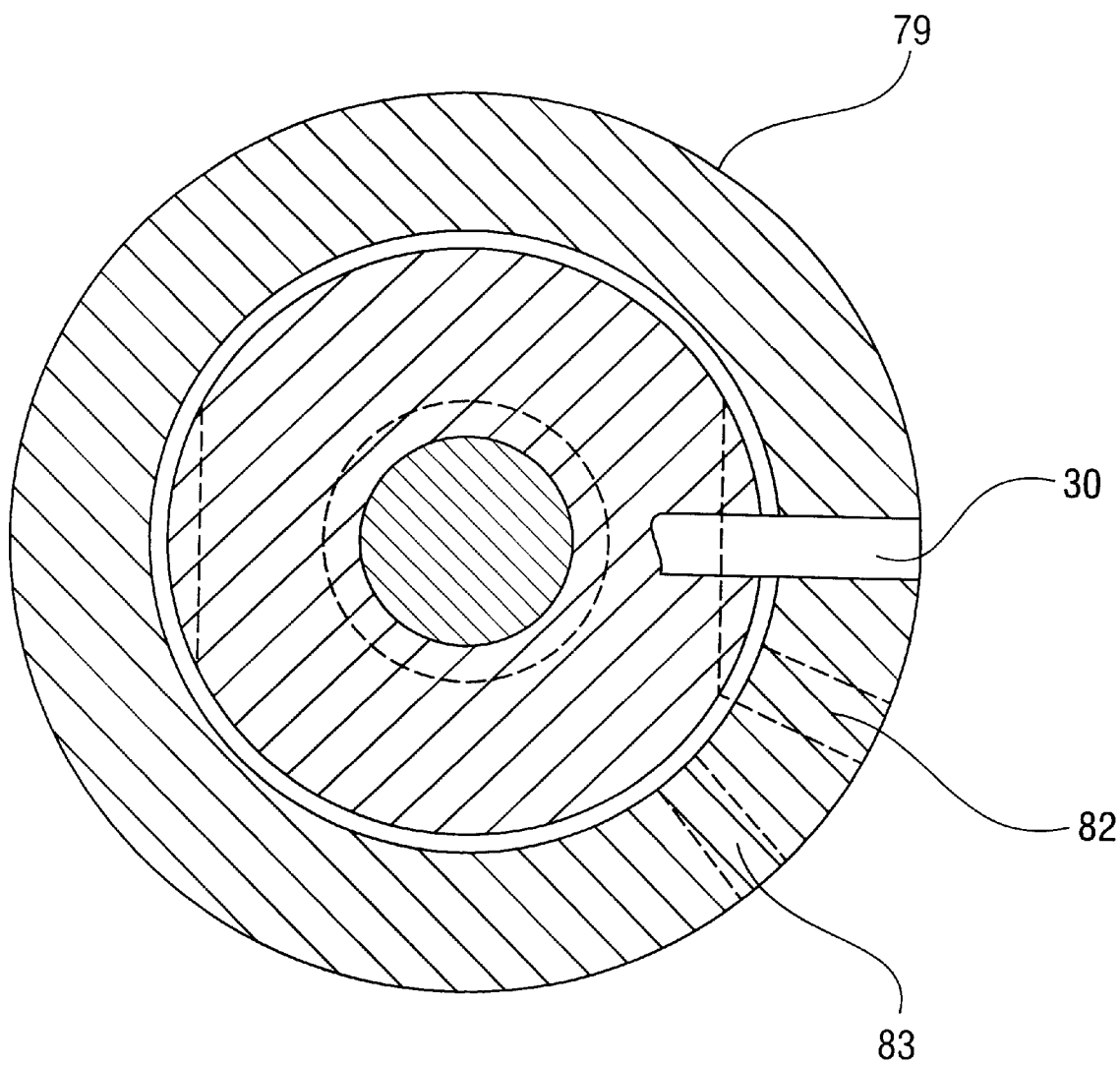
FIG. 4 is a cross section view of the male and female coupling members taken along line 4—4 of FIG. 3.

In FIG. 3, the male member and female member are shown with the poppet valves open in the locked position when pin (30) is in the third longitudinal portion (83) of the slot in the guide sleeve. In this position poppet valves (28, 22) are open sufficiently for hydraulic fluid to pass between the coupling members, and the spring plate remains slightly separated from shoulder (80) in the guide sleeve.

To engage the coupling members an ROV grips parallel flats (48) of the female member and pushes the female member into guide sleeve (50). The leading face (33) of the female member contacts spring plate (40), and the female member is pushed further into the guide sleeve, compressing spring (45). The male member then enteres the female member bore. Then, pin (30) enters first longitudinal portion (81) of the slot in the guide sleeve. As the female member continues to be pushed into the guide sleeve, the female member compresses spring (45) until the pin reaches the circumferential portion (84) of the slot. The ROV then rotates the female member, preferably less than ninety degrees, until the pin reaches either the second longitudinal portion (82) to "park" the female member, or the third longitudinal portion (83) in which hydraulic fluid may be transmitted between the coupling members. When the ROV releases the female member, spring (45) urges the female member outwardly from the guide sleeve until pin (30) reaches the end of second or third longitudinal portion of the slot in the guide sleeve. The bias of the spring will hold the pin in the selected slot to lock the female coupling member to the guide sleeve.

The present invention allows the coupling and locking operation to be accomplished using an ROV to grip the female member flats (48), and does not require the ROV to grip another component such as the male member of the coupling. To disconnect the coupling members, the same operation is repeated in reverse. This invention also allows a subsea ROV to disconnect the coupling members in a so-called "one-handed" manner.

Although it is preferred that one or two pins extend from the female coupling member, in combination with corresponding slots in the guide sleeve, three or more pins (and slots) also may be used in other embodiments within the scope of the invention.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having a cylindrical outer surface, an internal bore extending therethrough, and an external shoulder intermediate the cylindrical outer surface;
   (b) a guide sleeve having a first end attached to the male member and extending longitudinally from the male member, and a second end having a slot with three longitudinal portions, the first longitudinal portion extending to the second end of the guide sleeve and the second and third longitudinal portions terminating before reaching the second end of the guide sleeve, and a circumferential portion connecting between the longitudinal portions;
   (c) a spring positioned on the external shoulder of the male member inside the guide sleeve;
   (d) a female member insertable into the guide sleeve, the female member having a body and an internal bore adapted to receive the male member therein, and a pin extending radially outwardly from the body, the pin slidable in the first longitudinal portion of the slot when the female member is inserted into the guide sleeve, the female member rotatable with respect to the guide sleeve to cause the pin to slide in the circumferential portion of the slot, and the spring urging the female member outwardly from the guide sleeve to lock the female member to the guide sleeve when the pin is in the second or third longitudinal portions of the slot;
   (e) a normally closed check valve in at least one of the male and female members, the check valve controlling fluid flow through the coupling member, the check valve being open when the pin is in the third longitudinal portion of the slot and being closed when the pin is in the second longitudinal portion of the slot.

2. The undersea hydraulic coupling of claim 1 wherein the spring is a helical spring.

3. The undersea hydraulic coupling of claim 1 further comprising a spring plate positioned between the spring and the internal shoulder of the guide sleeve.

4. An undersea hydraulic coupling comprising:
   (a) a female member having a body with a longitudinal axis, a receiving chamber, and at least one pin extending radially outwardly from the body;
   (b) a male member having a first end, the male member adapted for fluid communication with the female member upon insertion of the first end into the receiving chamber;
   (c) a guide sleeve extending from the first end of the male member, the female member insertable into the guide sleeve, the guide sleeve having a slot for receiving the pin therein and allowing the pin to move between an unlocked position and two locked positions; and
   (d) bias means positioned in the guide sleeve for urging the female member outwardly from the sleeve and urging the pin into the locked positions.

5. The undersea hydraulic coupling of claim 4 wherein the female member body is rotated on its longitudinal axis to move the pin between the unlocked position and the locked positions.

6. The undersea hydraulic coupling of claim 4 wherein the bias means comprises a coil spring and a spring plate.

7. The undersea hydraulic coupling of claim 4 wherein the guide sleeve has an internal shoulder for limiting extension of the bias means.

8. The undersea hydraulic coupling of claim 4 wherein the male member and the female member each have poppet values that open upon full insertion of the first end of the male member into the receiving chamber and close when the first end of the male member is withdrawn from the receiving chamber, the pin positionable in one of the locked positions securing the female member to the guide sleeve when the first end of the male member is partially withdrawn from the receiving chamber.

9. A locking mechanism for a first coupling member having fluid communication with a second coupling member in an undersea hydraulic coupling, comprising:
   (a) a pin extending axially from the first coupling member;
   (b) a guide sleeve attached to the second coupling member, the guide sleeve having a slot in one end thereof, the slot having first, second and third longitudinal portions, a circumferential portion, each portion of the slot having a width sufficient to allow the pin to slide therein; the second longitudinal portion dimensioned to allow the first coupling member to disengage from fluid communication with the second coupling member while the pin is within the second longitudinal position; and (c) bias means for urging the pin into a locked position in the second or third longitudinal portion of the slot.

10. The locking mechanism of claim 9 wherein the bias means is a coil spring and a spring plate, the coil spring urging the spring plate against the first coupling member.

11. The locking mechanism of claim 9 wherein the first coupling member is rotatable with respect to the second coupling member to slide the pin along the circumferential portion of the slot between the unlocked position in the first longitudinal portion and the locked position in the second or third longitudinal portion of the slot.

12. The locking mechanism of claim 9 wherein the second longitudinal portion of the slot is longer than the third longitudinal portion of the slot.

* * * * *